United States Patent
Garrett, Jr. et al.

(10) Patent No.: US 8,874,966 B1
(45) Date of Patent: Oct. 28, 2014

(54) STORAGE DEVICE ERROR SIMULATOR TOOL

(75) Inventors: Wayne Garrett, Jr., Bellingham, MA (US); Zhiqi Liu, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 146 days.

(21) Appl. No.: 13/616,934

(22) Filed: Sep. 14, 2012

(51) Int. Cl.
*G06F 11/00* (2006.01)

(52) U.S. Cl.
USPC .......................................... 714/35; 709/224

(58) Field of Classification Search
CPC .............................. G06F 11/261; G06F 11/263
USPC ...................................................... 714/33, 35
See application file for complete search history.

(56) References Cited

U.S. PATENT DOCUMENTS

| | | | | |
|---|---|---|---|---|
| 5,671,352 | A * | 9/1997 | Subrahmaniam et al. | 714/41 |
| 7,114,150 | B2 * | 9/2006 | Dimpsey et al. | 717/131 |
| 7,467,333 | B2 * | 12/2008 | Keeton et al. | 714/41 |
| 7,761,927 | B2 * | 7/2010 | Reckless et al. | 726/32 |
| 8,285,834 | B2 * | 10/2012 | Gibson et al. | 709/224 |
| 8,595,680 | B1 * | 11/2013 | Steinberg | 716/136 |
| 2009/0036111 | A1 * | 2/2009 | Danford et al. | 455/419 |
| 2011/0055389 | A1 * | 3/2011 | Bley | 709/224 |
| 2012/0290718 | A1 * | 11/2012 | Nethercutt | 709/224 |
| 2013/0151930 | A1 * | 6/2013 | Yigzaw et al. | 714/768 |

* cited by examiner

Primary Examiner — Scott Baderman
Assistant Examiner — Paul Contino
(74) *Attorney, Agent, or Firm* — BainwoodHuang

(57) ABSTRACT

The system and method provide establishment of hooks in a send-path at inter-object interfaces of a layered stack of the storage driver and hooks in the completion-path execution sequence of storage driver of a storage system, the completion-path hook inserts replacement storage response messages to simulate the specified storage access error.

21 Claims, 7 Drawing Sheets

500

| 501 | dest -h | |
|---|---|---|
| 503 | dest -init [filename] | : Initialize the DEST utility. Optional XML configuration file can be loaded. |
| 505 | dest -add [add_args] | : Add a new record. If no args then the interactive mode is used. |
| 507 | dest -add_scenario [name] -d <b_e_s> | : Add a scenario. |
| 509 | dest -start | : Start error injection. |
| 511 | dest -stop | : Stop error injection. |
| 513 | dest -list_port_errors | : List port errors which can be injected. |
| 515 | dest -list_opcodes | : List opcodes which can be injected. |
| 517 | dest -list_scenarios | : List built-in scenarios. |
| 519 | dest -display | : Display active error records. |
| 521 | dest -save [filename] | : Save configuration as XML file. |

Fig. 5A

| | | |
|---|---|---|
| 525 | -d <b_e_s> | :*Required* Drive to inject. bus enclsoure_slot format |
| 527 | -et <type> | :*Required* Error Type = none|scsi|port.. |
| 529 | 'scsi' options: | |
| 531 | -sk <SK/ASQ/ASCQ> | :*Required for 'scsi'* Sense Key in hex format. i.e. 0x031100. |
| 533 | -ilba | :Invalid LBA bit in sense data. Default is valid LBA. |
| 535 | -def | :set deferred bit in sense data. Default is current. |
| 537 | 'port' options: | |
| 539 | -perr <value> | :*Required for 'port'* Port Error, string or numerical representation. Use --list_port_errors for string listing. |
| 541 | -lr <start> <end> | :LBA Range [start..end] inclusive. Defaults to [0x0..capacity] |
| 543 | -delay <msec> | :Delay IO in milliseconds. Defaults to 0. |
| 545 | -oc <value> | :Op-code string or numerical representation of opcode. Use -list_opcodes for list of values. Defaults to ANY |
| 547 | -num <value> | :Number of errors to insert. Defaults to 1. |
| 549 | -freq <N> | :Frequency of insertion given as 1 insertion per N IOs. Defaults to 1 (every IO). |
| 551 | -rfreq <N> | :Set insertions to be random, where probability of insertion is 1/N |
| 553 | -react_gap <type><value> | :type= time|io_count. Add gap between reactivations that can be time based or IO based. If 'time' value is msec. If 'io_count' value is num IOs to skip. Defaults to no gap. |
| 555 | -react_rgap <type><value> | :Same as previous option, except that time or io_count will be randomly selected from 1..N |
| 557 | -n_react<N> | :Number of Reactivations. Defaults to 0. |
| 559 | -n_rreact <N> | :Random Number of Reactivations will be randomly selected from 1..N |

Fig. 5B

STORAGE DEVICE ERROR SIMULATOR TOOL

BACKGROUND

A conventional storage array provides disk storage and multiple storage processors allowing access by one or more external host computers to the disk storage. The system can produce a large number of hardware and software errors. To test error handling and response in the conventional storage array an injection tool for injecting an error on the send path of an I/O request is used. The injection tool receives from an individual testing the storage array a Logical Block Address (LBA) or LBA range of addresses and an error code to be created upon access to the LBA or LBA range. The individual testing the storage array also runs a test sequence that attempts to access blocks in the LBA on the storage array. The storage array recognizing the LBA in the I/O request catches the I/O request and returns the error code back up the software stack of the I/O request. The operating software in storage array above the point where the I/O request is caught then exercises error correction routines in response to the returned error code.

SUMMARY

Unfortunately, there are deficiencies with the above-described testing of the conventional storage array. The catching of a particular I/O requests to a given LBAs or LBA ranges to produce a given error code requires extensive knowledge of the storage array and its sub-systems. Additionally, the catching of the I/O request on the send path and returning of an error code when no actual I/O is performed on the disk drives of the storage array can leave the storage array in an unknown state. The unknown state is caused by the disk or other component not being in the state that the error code returned by the I/O requests indicates. For example, a write request would update the disk and return an error. However, where the write is never applied to the LBA, the disk is not in the state that the write would place it in. Further, the storage array includes multiple storage processors. The conventional test inserts the error code in the send path of a single storage processor of storage array. Each storage processor may access the LBAs of the storage array, thus an error for a given LBA or LBA range should be reflected in both storage processors. Also, the conventional testing of the storage array does not allow for insertion of delays to simulate saturation in the storage array.

Advantageously, the improved technique provides for establishment of hooks in a send-path at inter-object interfaces of a layered stack of the storage driver and hooks in the completion-path execution sequence of storage driver of a storage system, the completion-path hook inserts replacement storage response messages to simulate the specified storage access error.

The use of hooks in the completion-path execution sequence of storage driver allows the I/O request to execute prior to modifying the result thereby leaving the disk in a consistent state. The hooks are established in a send-path at inter-object interfaces of a layered stack of the storage driver and hooks in the completion-path execution sequence of storage driver in both storage processors allowing both storage processors to be executed. Further, as the tester is not returning an error by short circuiting the send-path, the user does not need to know the relationship between interface objects in order to insert the hook to return the correct data.

One embodiment of the improved technique provides a method of testing storage software executing on one or more storage systems. The storage processor in response to input establishes send-path hooks at inter-object interfaces of a send path of a layered stack of the storage driver, the send-path hooks usable to selectively modify storage command messages. The storage processor in response to a test command input specifying a storage access error to be simulated to test storage software by selection of one or more of the send-path hooks and configuring the selected one or more of send-path hooks to monitor for a specified storage command message and insert at least one of (1) a replacement storage command message to simulate the specified storage access error and (2) a completion-path hook into a completion-path object execution sequence. The storage processor after having performed the I/O operation executes the completion-path hook in the completion-path object execution sequence, inserting a replacement storage response message to simulate the specified storage access error.

Another embodiment of the improved technique is directed to a system of testing storage software executing on one or more storage systems. The storage system includes a storage processor circuit configured and arranged to establish send-path hooks at inter-object interfaces of a send path of a layered stack of a storage driver, the send-path hooks usable to selectively modify storage command messages. The storage processor circuit also responds to a test command input that specifies a storage access error to be simulated to test storage software by selection of one or more of the send-path hooks and configures the selected one or more of send-path hooks to monitor for a specified storage command message and insert at least one of (1) a replacement storage command message to simulate the specified storage access error and (2) a completion-path hook into a completion-path object execution sequence. The storage system also executes the completion-path hook in the completion-path object execution sequence and inserts a replacement storage response message to simulate the specified storage access error.

One embodiment of the improved technique is directed to a non-transitory computer readable storage medium with a computer program stored thereon. The computer program upon execution by a processor performs the method of testing storage software executing on one or more storage systems.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIGS. 5A and 5B illustrate a command line interface description of a drive error simulation tool.

DETAILED DESCRIPTION

Figure 1:
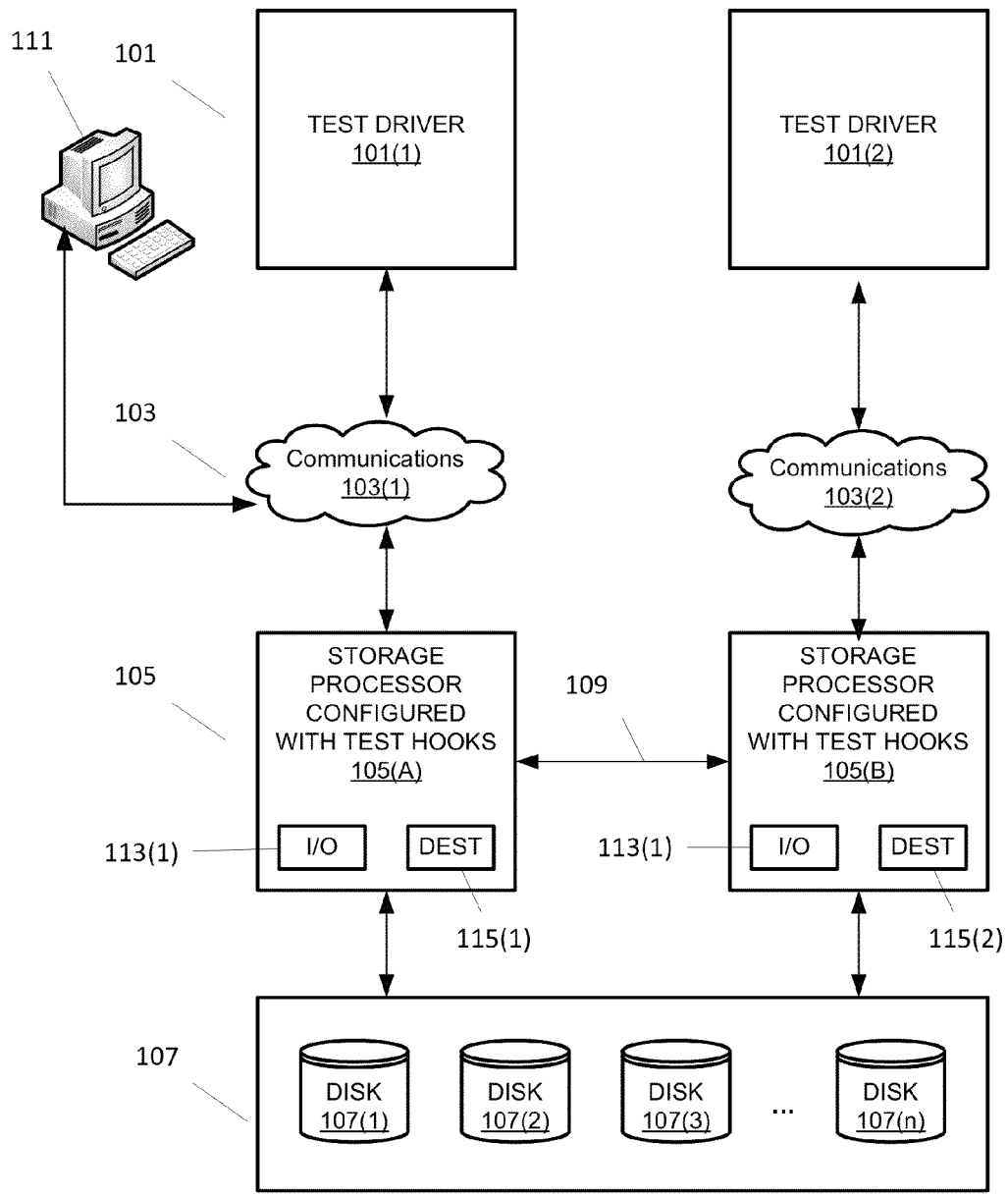
FIG. 1 is a block diagram of a data storage system which is configured to insert hooks in a send path and execute hooks in a return path of a software stack of the device driver.

FIG. 1 is a block diagram of a data storage system 100 which is configured to insert hooks in a send path and execute hooks in a return path of a software stack executed to perform I/O. The storage system 100 includes a set of test driver 101(1) and 101(2), (i.e. test driver hosts 101) and a communications conduit 103(1) and 103(2) (i.e. communication conduits 103) for connecting the test drivers 101 to storage processors configured with test hooks 105(A) and 105(B) (i.e. storage processors 105). The storage processors configured with test hooks 105(A) and 105(B) are connected to each other via bus 109 allowing communication there between. The storage processors 105 are connected to a set of disks 107(1) through 107(n).

The storage processors 105 are configured to perform data storage operations (e.g., read operations, write operations, etc.) on behalf of test drivers 101. It should be understood that the test drivers 101 run scripts requesting I/O to a given disk drive 107. The set of disk drives 107 enables the data storage system 100 to store and retrieve data on behalf of the test drivers 101 in a fault tolerant, non-volatile manner (e.g., using a RAID scheme).

Each storage processor 105 is configured using DEST 115 to catch data storage operations performed by the I/O software 113 that includes a read or write command to a given LBA on a given disk 107. It should be understood that the software to operate the storage processor are stored on a non-transitory computer readable medium loaded into a memory and executed by a processor of the storage processor 105. A tester inputs the tests into DEST 115 via a console 111 attached to the system 100 via network 113. Each storage processor 105 has inserted in its send path, send hooks that are placed between the object interfaces in the driver code of the storage processor 105. The send path hook searches for the storage command message with a given LBA for a given disk drive 107. The send path hook upon catching a matching storage command message alters the storage command message to insert an error into the test command and further inserts a completion path hook into a completion-path object execution sequence. Upon the storage command message completing the completion-path hook is automatically executed and it either alters the result of the storage command message to simulate the error or inserts a delay in returning further up the layered stack of the storage driver, thereby simulating saturation of the disk drive 107 or other error.

For example, an individual tester enters a command to instruct the storage processors 105 to intercept read operations to disk drive 107(1). The command also set an LBA range of 0x0 to 0x1d7FF. The tester also defines the error type, for example, SCSI, and that the error is an unrecovered read error (0x031100). The tester further defines that the number of errors to insert is 4294967294 and should be inserted every 5$^{th}$ I/O.

The test driver 101 begins a sequence of four reads of LBA 0x1-0x04 on the disk drive 107(1). The storage processor has a send-path hook in the send path of a layered stack of the storage driver examine the test command input. The send-path hook determines that the LBA's of each read are in the correct range, the disk drive 107(1) is the drive that is being tested and I/O type is a read. However, only the every fifth read is acted upon. As such, each of the reads of LBA 0x1-0x04 on the disk drive 107(1) are allowed to complete without any changes to the storage command message or by specifying a completion-path hook to be execute on the completion-path of the test command input.

However, when the test driver begins a fifth read of LBA 0x5 on disk drive 107(1), the send-path hook in the send path of a layered stack of the storage driver examines the values which match the criteria inputted by the tester. The send-path hook further determines this is the fifth read which matches all the criteria required by the tester. The send-path hook inserts a completion-path hook into a completion-path object execution sequence.

The storage processor executing the completion-path object execution sequence executes the completion-path hook. The completion-path hook inserts the error code 0x031100 into the result returned by the completion-path object execution sequence. It should be understood that software objects above the object where the error code is inserted would perform error correction and any other error handling required by the error code, thus testing the error path of the completion-path object execution sequence.

Figure 2:
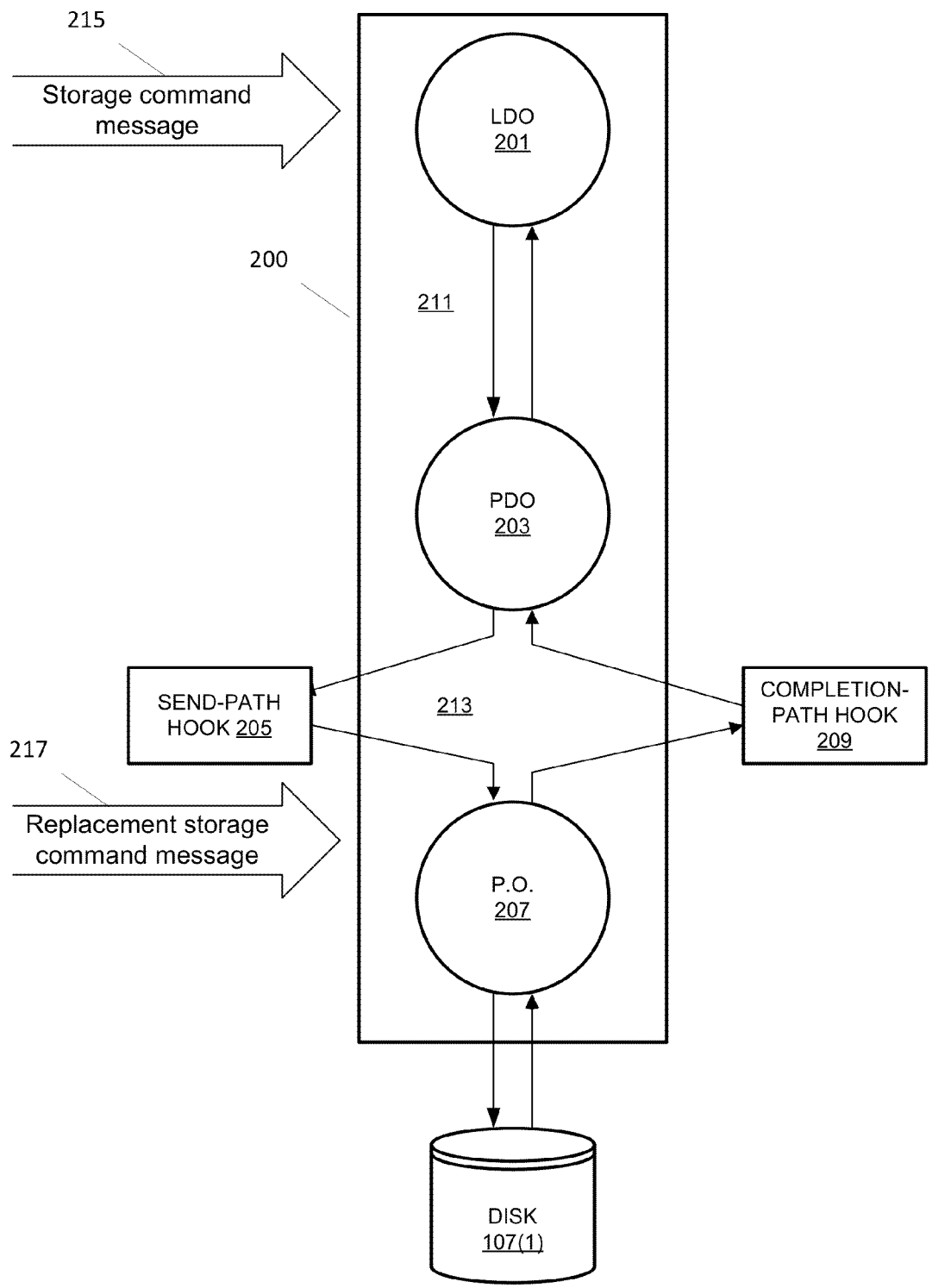
FIG. 2 is a graphic illustrating a storage driver with execution objects and inter-object interfaces between the objects with hooks.

FIG. 2 is a graphic illustrating a storage driver 200 with execution objects and inter-object interfaces between the objects with hooks. The storage driver 200 includes a logical data object (LDO) 201, a physical data object (PDO) 203 a port object (P.O.) 207. The send-path hook 205 can be placed at any interface. In the instant figure the send-path hook 205 is inserted between the physical data object 203 and the port object 207. The send-path hook 205 could also, for example, be inserted between the logical data object 201 and the physical data object 203.

The send-path hook 205 is defined by an individual tester. The send-path hook 205 defines under what conditions a storage command message 215 will be processed to simulate a drive error. The send-path hook 205 catches and individual storage command message 215 that match the criteria defined by the individual tester. The storage driver 200 in response to the storage command message 215 executes the logical data object 201. As there is no send-path hook 205 at the interface 211 between the logical data object 201 and the physical data object 203, execution proceeds to the physical data object 203. The physical data object 203 performs its functionality and then, at the interface 213 between the physical data object 203 and the port object 207, the send-path hook 205 executes. The send-path hook 205 compares the criteria defined by the individual tester. Upon the criteria matching, the send-path hook 205 inserts the completion-path hook into the completion-path object execution sequence or modifies the storage command message 215 to form a replacement storage command message 217. Execution on the send-path of the storage then proceeds to the port object 207. The storage driver 200 after executing the port object 207 performs the read from the disk drive 107(1).

The storage driver 200 reads from the disk drive 107(1) and returns no error. The port object 207 of the storage driver 200 returns the result to completion-path hook 209. The completion-path hook 209 alters the result to 0x031100 and returns that value to the physical data object 203. The physical data object 203 may have error handing functionality for dealing with the error code 0x031100 and if so the error handing functionality will be exercised for the inserted error. The physical data object 203 having completed execution returns the resulting error code 0x031100 to the logical data object 201 where error functionality therein may act on the error. The logical data object 201 completes execution and returns the resulting error code to the object above it (not shown) in the storage driver software stack.

Figure 3:
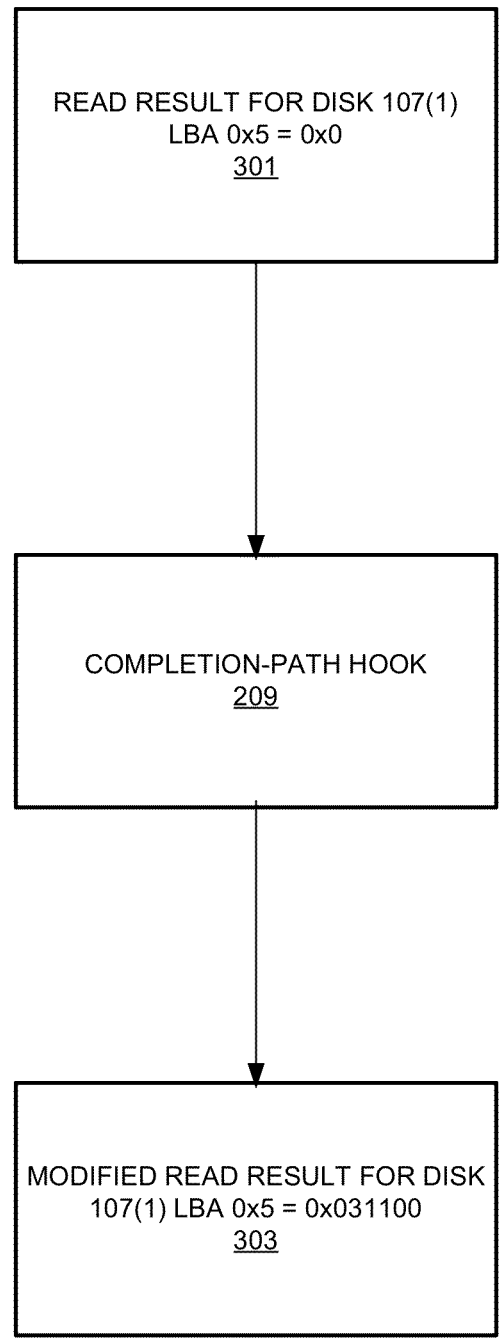
FIG. 3 is a graphic illustrating the transformation of a result of a read operation.

FIG. 3 is a graphic illustrating the transformation of a read result 301 of a read operation by the completion-path hook 209. As discussed in the example above, a fifth read of disk drive 107(1) to LBA 0x5 is intercepted by a send-path hook which inserts the completion-path hook 209 in completion-path object execution sequence. The read result 301 for disk 107(1) targeting LBA 0x5 has a return code of 0x0. The return code of 0x0 indicates that the read was successful. However, the completion path hook 209 executed in completion-path object execution sequence modifies the return code. Thus, the modified read result 303 has the value 0x031100 indicated an unrecovered read error. The modified read result is returned to the objects above the completion-path hook in completion-path object execution sequence.

Figure 4:
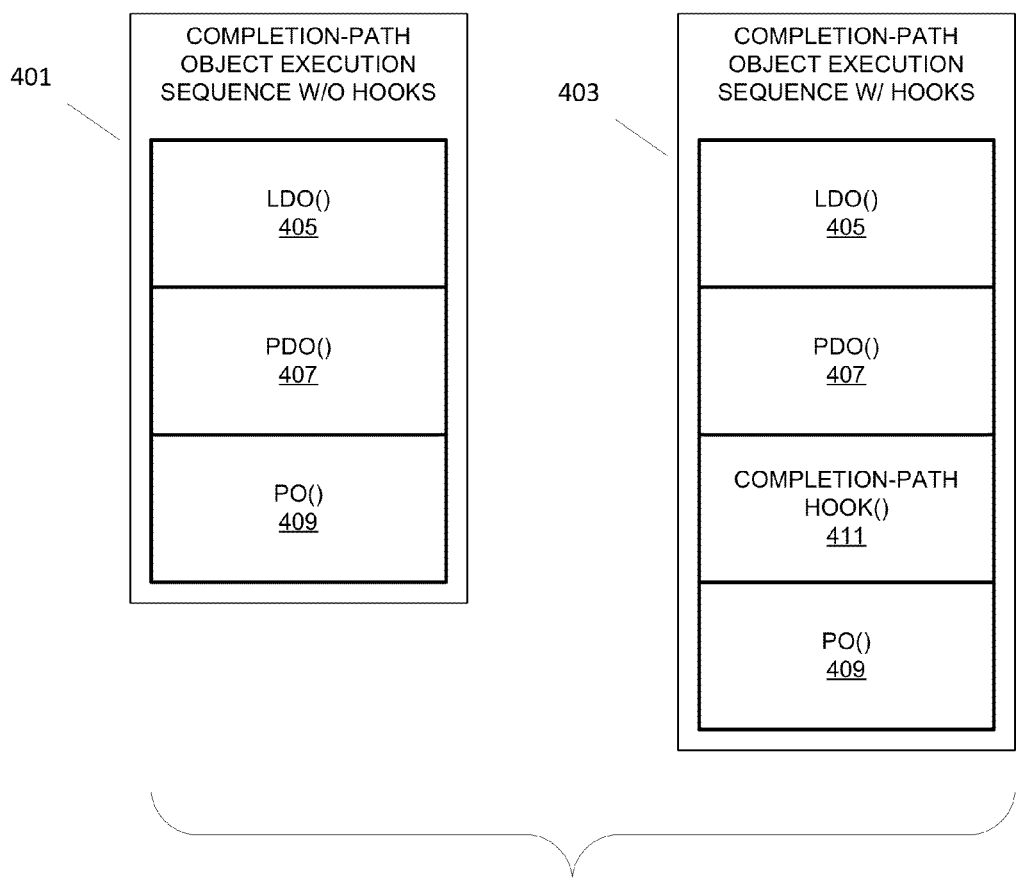
FIG. 4 is a graphic illustrating a completion-path execution sequence with and without a completion-path hook.

FIG. 4 is a graphic illustrating a completion-path execution sequence with and without a completion-path hook. A first completion-path execution sequence 401 is the completion-path execution sequence where no completion-path hook is inserted by the send-path hook 205. The first completion-path execution sequence 401 contains a return path executing the return sequence of port object (PO) 409, then a physical data object (PDO) 407 and then a logical data object (LDO) 405.

A second completion-path execution sequence 403 illustrates the send-path hook 205 inserting the completion-path hook 411 into the completion-path execution sequence such that after the port object 409 executes, the completion-path hook 411 executes prior to the physical data object 407 when returning from a read transaction.

FIGS. 5A and 5B illustrate a command line interface 500 of a drive error simulation tool. In particular FIG. 4A includes the main command line interface commands. The storage system provides a command line interface 500 for inserting the criteria required for catching storage command message 215 when testing the storage system 100. The command line interface 500 provides a "dest-h" command 501 entered on a command line of the DEST 115 for displaying all the commands the command line interface 500 can accept. The individual performing the test may setup test criteria by entering "dest-init" command" 503 to have DEST 115 load an extensible markup language file (XML) defining the criteria to be used to test a disk drive 107. It should be understood that the XML file contains the required fields and any optional fields required to set up the criteria for a given test that will invoke the send-path hook 205.

The command line interface 500 also provides a "dest-add" command 505 for adding individual records to DEST 115. It should be understood that when entering the "dest-add" command 505, the individual will also enter at least the required parameters for any given test record.

The drive error simulation tool (DEST) 115 also provides for adding a predefined scenario by entering "dest-add_scenario" 507 for a named disk drive 107. For example, default scenarios are SLOW_IO for slowing a disk drive 107's response time to reads and writes and RANDOM_MEDIA_ERROR for injecting a random media error to the named disk drive 107 at random intervals when the hooks are executed. It should be understood that disk drives are identified in the form of bus/enclosure/slot. The command line interface 500 also provides for defining the point that errors start being injected using "dest-start" 509 and when errors are stopped being injected using "dest-stop" 511.

The command line interface 500 also provides commands for listing port errors that can be injected using the "dest-list_port_errors" command 513; listing opcodes using "dest-list_opcodes" 515 that are searched for by the send-path hook 205, for example, READ or WRITE operations; or scenarios using the "dest-list_scenerios" command 517 as set by the "dest-add_scenarios" command 507.

The command line interface 500 also provides for displaying active test records using the "dest-display" command 519.

The command line interface 500 also provides for saving any input record in the form of an XML file using the "dest-save" command 521.

FIG. 4B in particular list the parameters/arguments that the "dest-add" command 505 uses. The "dest-add" command 505 requires the naming of disk drive 107 to be tested. Thus, the command further includes "-et<type>" 527 for the error type to be tested. For example, the error type could be one of a SCSI error 529 or a port error 537. When the tester defines the error type to be SCSI 529, they must further define on the command line they type of sense key, "-sk<SK/ASQ/ASCQ>" 531). The tester may optionally enter at the command line that the error should be invalid send data by entering the argument "-ilba" 533. If the tester wishes to set the deferred bit in sense data, he or she enters a parameter of "-def" 535. If the error type inputted on the command line 500 is "port" 535, then a required parameter defining the port error "-perr" 539 is also entered.

As discussed in our example above, an LBA is normally defined. The command line interface includes an input for an LBA or LBA by inputting "-lr<start><end>" 541. It should be understood, that an LBA is not defined at the command line interface 500 then the default is to test all LBAs on the disk drive 107. A parameter for entering a delay in milliseconds is included by inputting "-delay<msec>" 543 on the command lane. Likewise, the opcode to be tested is entered as the parameter "-oc<value>" 545.

The command line interface includes an input for defining the number of errors to be injected in any one test sequence by adding parameter "-num<value>" 547 on the command line. Optionally, the number of errors inserted can also define the frequency in which the errors are inserted during the test by inputting "-freq<N>" 549 or a semi random frequency by inputting the parameter "-rfreq<N>". The insertions may also have a reactivation gap that is added by time between I/Os by inputting "-react_gap<type><value>" 553 on the command line or pseudo randomly based on a count by inputting "-react_rgap<type><value>" 555 on the command line. The tester can further define the number of reactivations by entering the parameter "-n_react<N>" 557 on the command line or the number of pseudo random reactivations (559) by entering the parameter "-n_rreact<N>" 559 on the command line. It should be understood by entering the commands through the workstation 111 hooks are placed in the inter object interfaces 211 and 213 of the storage driver 200 and catch and modify test commands exercising the disk 107.

Figure 6:
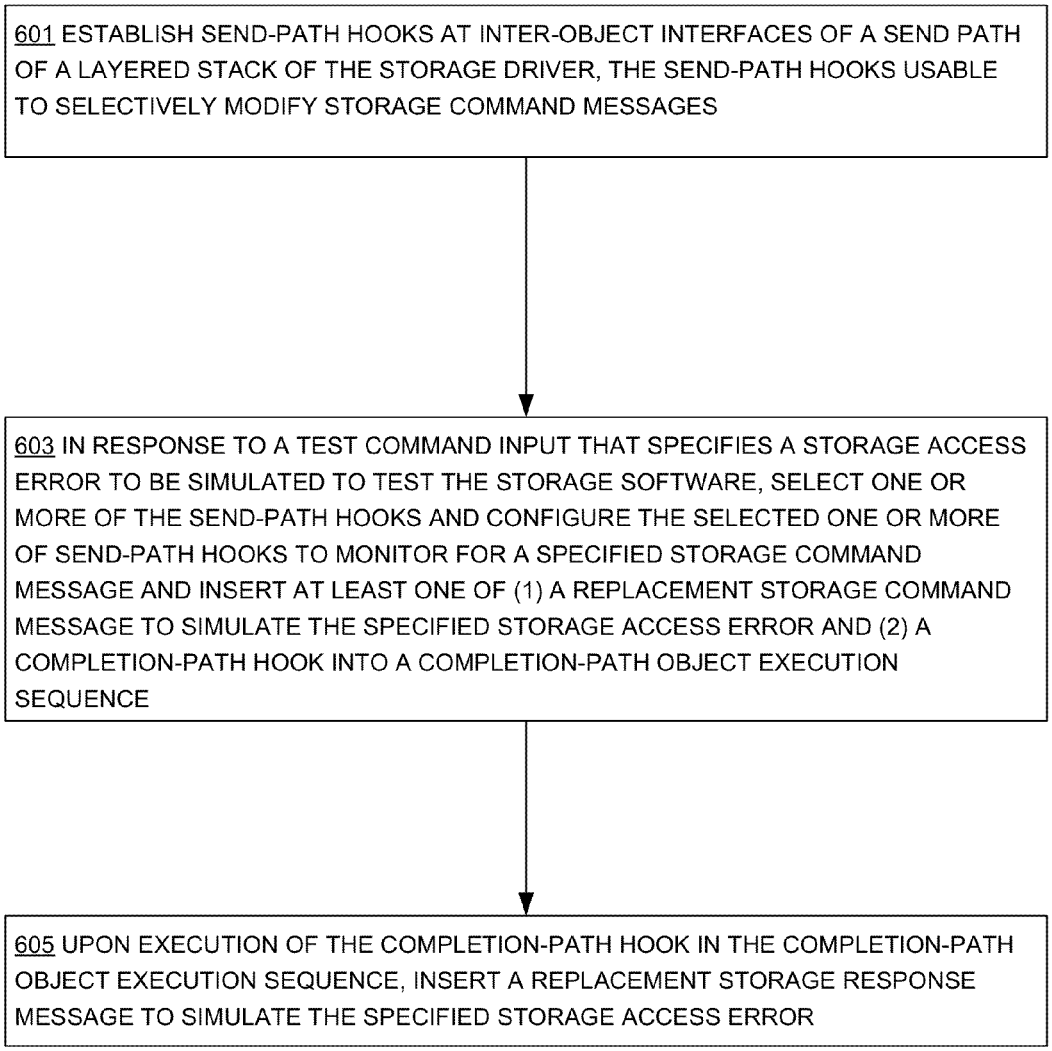
FIG. 6 is a flowchart illustrating a method of storage software executing on one or more storage systems.

FIG. 6 is a flowchart illustrating a method of storage software executing on one or more storage systems 100. The storage system 100 establishes send-path hooks 205 at inter-object interfaces 211 and 213 of a send path of a layered stack of a storage driver 200, the send-path hooks 205 usable to selectively modify storage command messages 300. The storage system 100 in response to a test command input specifies a storage access error to be simulated to test storage software, selects one or more of the send-path hooks 205 and configuring the selected one or more of send-path hooks 205 to monitor for a specified storage command message 215 and insert at least one of (1) a replacement storage command message 217 to simulate the specified storage access error and (2) a completion-path hook 209 into a completion-path object execution sequence 403. The storage system 100 further executes the completion-path hook 209 in the completion-path object execution sequence 403, inserting a replacement storage response message 303 to simulate the specified storage access error.

While various embodiments of the present disclosure have been particularly shown and described, it will be understood by those skilled in the art that various changes in the form and details may be made therein without departing from the spirit and scope of the present disclosure as defined by the appended claims.

For example, the storage processor 105 include a processor and memory for loading a computer program stored on non-transitory computer readable storage medium such as the disk 107. It should be understood that a system including circuits is formed by the execution of the computer program in the processor at any given point in time during the execution of the computer program by the processor.

What is claimed is:

1. A method of testing storage software executing on one or more storage systems, the storage software including a storage driver having a layered stack of objects, the method comprising:
   receiving, at the one or more storage systems, a storage command message from at least one host via a communication conduit;
   establishing send-path hooks at inter-object interfaces of a send path of the layered stack of the storage driver, the send-path hooks usable to selectively modify processing of the storage command messages;
   in response to a test command input specifying a storage access error to be simulated to test the storage software, selecting one or more of the send-path hooks and configuring the selected one or more of send-path hooks to monitor for a specified storage command message and insert a completion-path hook into a completion-path object execution sequence of the layered stack of the storage driver; and
   upon executing the completion-path hook in the completion-path object execution sequence, inserting a replacement storage response message and returning it to the host to simulate the specified storage access error.

2. The method according to claim 1, wherein establishing send-path hooks at inter-object interfaces of the send path of the layered stack of a storage driver further includes:
   specifying a frequency upon which the send-path hooks will insert the storage access error in response to the storage command messages.

3. The method according to claim 1, wherein establishing send-path hooks at inter-object interfaces of the send path of the layered stack of a storage driver further includes:
   specifying a type of storage access error produced in response to the storage command messages.

4. The method according to claim 3, wherein specifying a type of storage access error produced in response to the storage command messages further includes:
   specifying the type of storage access error is one of a small computer system interface (SCSI) error or a port error.

5. The method according to claim 1, wherein establishing send-path hooks at inter-object interfaces of a send path of a layered stack of the storage driver further includes:
   specifying a time to delay a response to each storage command message upon executing the completion-path hook.

6. The method according to claim 5, wherein the executing the completion-path hook in the completion-path object execution sequence further includes:
   delaying a return to a next object in the completion-path object execution sequence for the specified time to delay.

7. The method according to claim 1, wherein the testing storage software executing on the one or more storage systems includes communicating, by two storage processors, between each other and with a same array of Logical Block Address memory devices.

8. The method according to claim 1, wherein the test command input includes transmitting tests from an external system via a communication conduit to a drive error simulation tool portion of the one or more storage systems.

9. The method according to claim 1, wherein selectively modifying processing of the storage command messages includes leaving a storage location specified in the storage command in a known state.

10. A system of testing storage software executing on one or more storage systems, the storage software including a storage driver having a layered stack of objects, the system comprising:
    a storage processor configured and arranged to receive a storage command message from at least one host via a communication conduit;
    the storage processor is further configured and arranged to establish send-path hooks at inter-object interfaces of a send path of the layered stack of the storage driver, the send-path hooks usable to selectively modify processing of the storage command messages;
    the storage processor is further configured and arranged to respond to a test command input that specifies a storage access error to be simulated to test the storage software by selection of one or more of the send-path hooks and configuring the selected one or more of send-path hooks to monitor for a specified storage command message and insert a completion-path hook into a completion-path object execution sequence of the layered stack of the storage driver; and
    upon execution of the completion-path hook in the completion-path object execution sequence, inserting a replacement storage response message and returning it to the host to simulate the specified storage access error.

11. The system according to claim 10, wherein the storage processor further configured to:
    receive a value that specifies a frequency upon which the send-path hooks will insert the storage access error in response to the storage command messages.

12. The system according to claim 10, wherein the storage processor further configured to:
    receive a value that specifies a type of storage access error produced in response to the storage command messages.

13. The system according to claim 12, wherein the storage processor further configured to:
    receive a value that specifies the type of storage access error is one of a small computer system interface (SCSI) error or a port error.

14. The system according to claim 10, wherein the storage processor further configured to:
    receive a value that specifies a time to delay a response to each storage command message upon executing the completion-path hook.

15. The system according to claim 14, wherein the storage processor further configured to:
    delay a return to a next object in the completion-path object execution sequence for the specified time to delay.

16. A non-transitory computer readable storage medium with a computer program stored thereon, the computer program executed by a processor to perform a method of testing storage software executing on one or more storage systems, the storage software including a storage driver having a layered stack of objects, the method comprising:

receiving, at the one or more storage systems, a storage command message from at least one host via a communication conduit;

establishing send-path hooks at inter-object interfaces of a send path of the layered stack of the storage driver, the send-path hooks usable to selectively modify processing of the storage command messages;

in response to a test command input specifying a storage access error to be simulated to test storage software, selecting one or more of the send-path hooks and configuring the selected one or more of send-path hooks to monitor for a specified storage command message and insert a completion-path hook into a completion-path object execution sequence of the layered stack of the storage driver; and upon executing the completion-path hook in the completion-path object execution sequence, inserting a replacement storage response message and returning it to the host to simulate the specified storage access error.

17. The non-transitory computer readable storage medium according to claim 16, wherein establishing send-path hooks at inter-object interfaces of the send path of the layered stack of a storage driver further includes:

specifying a frequency upon which the send-path hooks will insert the storage access error in response to the storage command messages.

18. The non-transitory computer readable storage medium according to claim 16, wherein establishing send-path hooks at inter-object interfaces of the send path of a layered stack of a storage driver further includes:

specifying a type of storage access error produced in response to the storage command messages.

19. The non-transitory computer readable storage medium according to claim 18, wherein specifying a type of storage access error produced in response to the storage command messages further includes:

specifying the type of storage access error is one of a small computer system interface (SCSI) error or a port error.

20. The non-transitory computer readable storage medium according to claim 16, wherein establishing send-path hooks at inter-object interfaces of the send path of the layered stack of a storage driver further includes:

specifying a time to delay a response to each storage command message upon executing the completion-path hook.

21. The non-transitory computer readable storage medium according to claim 20, wherein the executing the completion-path hook in the completion-path object execution sequence further includes:

delaying a return to a next object in the completion-path object execution sequence for the specified time to delay.

* * * * *